(No Model.)

P. WHITE.
WATER CLOSET VALVE.

No. 312,687.　　　　　　　　Patented Feb. 24, 1885.

Attest:
Charles Pickles
T. W. Sanford

Inventor;
Peter White
by C. D. Moody
atty

UNITED STATES PATENT OFFICE.

PETER WHITE, OF ST. LOUIS, MISSOURI.

WATER-CLOSET VALVE.

SPECIFICATION forming part of Letters Patent No. 312,687, dated February 24, 1885.

Application filed July 11, 1884. (No model.)

*To all whom it may concern:*

Be it known that I, PETER WHITE, of St. Louis, Missouri, have made a new and useful Improvement in Water-Closet Valves, of which the following is a full, clear, and exact description, reference being had to the annexed drawings, making part of this specification, in which—

Figure 1:
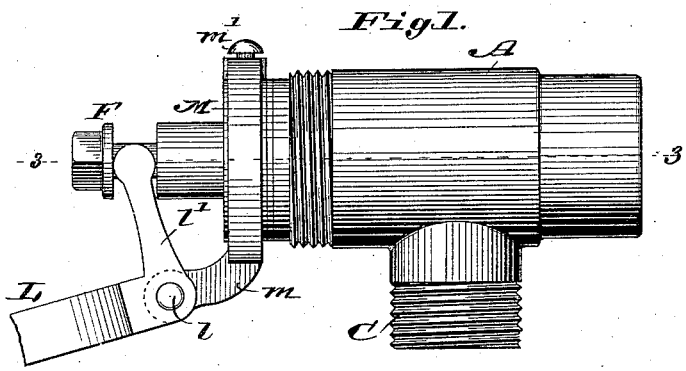
Figure 2:
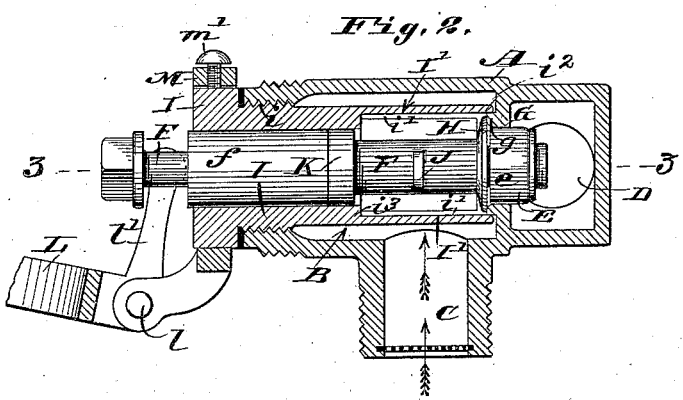
Figure 3:
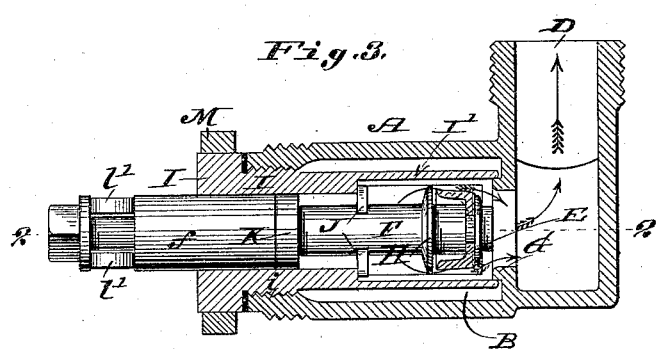
Figure 4:
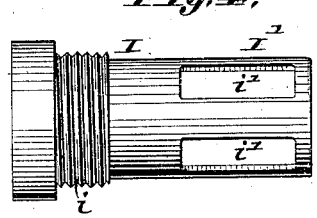

Figure 1 is a side elevation of the improved valve; Fig. 2, a longitudinal section thereof on the line 2 2 of Fig. 3; Fig. 3, a longitudinal section on the line 3 3 of Fig. 2, and Fig. 4 a side elevation of the plug within which the valve works.

The same letters of reference denote the same parts.

The present invention relates to the valve and the parts immediately therewith associated.

A represents the casing which incloses the valve-chamber, the valve, and the parts therewith connected. The water flows to the valve-chamber B through the inlet C, and is discharged therefrom through the outlet D. The valve E is in the form of a cup-leather, is attached to the valve-stem F, and seats at G. The valve is adapted to open against the pressure and into a space larger in diameter than that of the seat G. The valve is shown closed in Fig. 2 and opened in Fig. 3.

H represents a flange attached to the valve-stem F. It is slightly larger in diameter than the valve. Its function is to spread the water when the valve is open, and cause the water to be diverted to the outer side of the valve-flange e, and thus prevent the valve-flange from being expanded so as to impede the flow of water. The flange H also serves as a stop, as shown in Fig. 2, to prevent the valve in seating from moving too far through the seat.

The valve-stem, in place of being made to work directly in some fixed bearing in the casing, is preferably adapted to work in a plug, I, which, as shown at $i$, is threaded to enable it to be screwed into the casing. The plug is extended inwardly to reach past the position of the valve when open, and the extended portion I' has several perforations, $i'$, therein, to provide passages through which the water can flow from the valve-chamber B to within the extension I', and thence past the valve, as represented in Fig. 3. The extension I' in effect then resembles a cage, and its internal diameter, while somewhat larger than that of the flange H, is not so large as to allow of the valve-flange being flattened out therein. The extension I' therefore assists in keeping the cup-leather flange in shape when the valve is open, for allowing the water to flow past the valve. The inner end, $i^2$, of the extension I' is also preferably adapted to fit the flange $g$, which surrounds the valve-seat G. This serves to guide to its bearing and to steady the inner end of the plug. The valve-stem is also supplied with one or more projections, J, which are adapted to operate, in connection with shoulders $i^3$, upon the plug I, as shown in Fig. 3, and so as to prevent the valve from being opened too far. The valve-stem within the main part of the plug I is provided with a cup-leather valve, K, which is turned in the opposite direction from that of the valve E. Its function is partly to balance the valve H and partly to serve as a packing for the valve-stem.

L represents the float-lever. It is pivoted at $l$ to the extension $m$ of the ring M, and it is provided with the arms $l'$ $l'$, which extend upward suitably to engage with the valve-stem F, substantially as shown in the various figures. The ring M is made adjustable upon the plug I, so that after the plug has been screwed to a bearing within the casing the ring M can be suitably adjusted thereon, and when adjusted secured by means of the screw $m'$. The stem F, where it works in the plug I, is enlarged, substantially as shown at $f$.

I claim—

1. The combination, substantially as described, of the casing A, the chamber B, the inlet C, the outlet D, the cup-leather valve E, the stem F, the flange H, and the seat G.

2. The combination, substantially as described, of the chamber B, the plug I, the casing A, the seat G, the stem F, the flange H, and the cup-leather valve E.

3. The combination, substantially as described, of the casing A, the chamber B, the inlet C, the outlet D, the stem F, the cup-leather valve E, the flange H, and the plug I, having the perforated extension I'.

4. The combination, substantially as described, of the casing A, the chamber B, the inlet C, the outlet D, the stem F, the cup-leather valve E, the flange G, the flange H, the projection or projections J, the cup-leather valve K, and the plug I, having the perforated extension I'.

PETER WHITE.

Witnesses:
C. D. MOODY,
C. E. HUNT.